Sept. 25, 1962     A. C. ELD ET AL     3,055,646

VAPOR-LIQUID CONTACTING APPARATUS

Filed April 8, 1959

INVENTORS
AKSEL C. ELD
WILLIAM R. LEHRIAN
BY
Horace B. Cooke
ATTORNEY the conventional bubble cap tray, a tubular chimney surrounds each opening or vapor passage and a stationary bell-shaped cap surmounts each chimney. The vapor rises from below the tray through the chimney, is diverted downwardly by the cap and bubbles out through slots in the cap or under the edges of the cap.

When the ratio of liquid to vapor is not excessive the conventional bubble caps function reasonably well. However, in some operations they have serious disadvantages. For example, when the liquid flow greatly exceeds the vapor flow, as may occur in high pressure fractionation of hydrocarbon mixtures, there is a serious danger of "liquid dumping" which is the flow of liquid under the bubble caps and down the column through the vapor chimneys. When this occurs proper vapor-liquid contact is not obtained.

Bubble trays have been designed with the specific purpose of avoiding liquid dumping. One such tray employs a floating plate cap over each hole in the tray. The periphery of the cap rests on the tray floor and forms a liquid seal. This type of cap is simply a freely floating disc, loosely enclosed within an overhead framework that limits its upward movement. For any particular cap, when the vapor velocity is sufficiently high, the cap is raised from the tray floor and vapor can bubble through the liquid on the tray. When the vapor velocity is low, the cap remains seated on the tray floor covering the hole in the tray and sealing against the flow of liquid downwardly through the vapor passage.

The conventional floating plate cap type of bubble tray has to some extent reduced the problem of liquid dumping in fractionating towers. However, it has not been entirely successful in this respect and, furthermore, has other disadvantages. In the conventional structure each hole or vapor passage in the tray is covered by a single floating cap, the cap being only slightly larger in area than the hole. When the cap is lifted all of the vapor flowing from under the cap flows through the one large hole. Consequently, there is a tendency to form large bubbles. Furthermore, the cap is easily tiltable and all of the vapor may escape under one side of the tilted cap. As a result of the large bubbles and the poor distribution of bubbles about the rim of the cap, intimate contacting of all portions of the vapor and liquid is not obtained.

The conventional floating plate cap has another disadvantage. As we have said, this type of cap is enclosed by an overhead framework. Each tray has a large number of these frameworks extending upwardly from its surface and they provide a substantial resistance to liquid flow across the tray. Because of the flow resistance there is a substantial difference in liquid level or head across the tray, the liquid level being much higher on the inlet side of the tray than on the outlet side. A marked difference in liquid head across the tray is undesirable because, unless other steps are taken to prevent it, the vapor will rise more readily on the side of the tray with low liquid level and the entire tray surface will not be used efficiently. Another disadvantage of the described type of tray is the difficulty of cleaning the surface of the tray. The overhead frameworks surmounting the vapor passages provide collecting places for tarry deposits and the irregular surface of the tray is difficult to clean when the tower is shut down for periodic cleaning.

Our present invention provides an improved bubble tray structure which avoids or reduces the problems of liquid dumping encountered with conventional bell cap and chimney bubble trays and the problems of poor liquid-vapor contact, excessive resistance to liquid flow and difficulty of cleaning that are encountered with the conventional floating plate cap type of tray. In general, the apparatus of our invention comprises a vapor-liquid contacting tray having a plurality of openings which serve as vapor passages. Each opening is provided with an upwardly movable or vertically displaceable bubble cap assembly comprising a disc-like cap surmounting the opening in the tray. The cap is provided with a depending, vertical cylinder which hangs through the opening in the tray. The cylinder has apertures, such as vertical slots, spaced about its circumference, and the lower end or base of the cylinder is open. The lower rim of the cylinder is provided with an outturned lateral extension or flange which is spaced a short distance below the tray when the cap rests on the tray floor and which limits the upward movement of the cap.

We will describe our invention in more detail by reference to the drawings of which:

Figure 1:
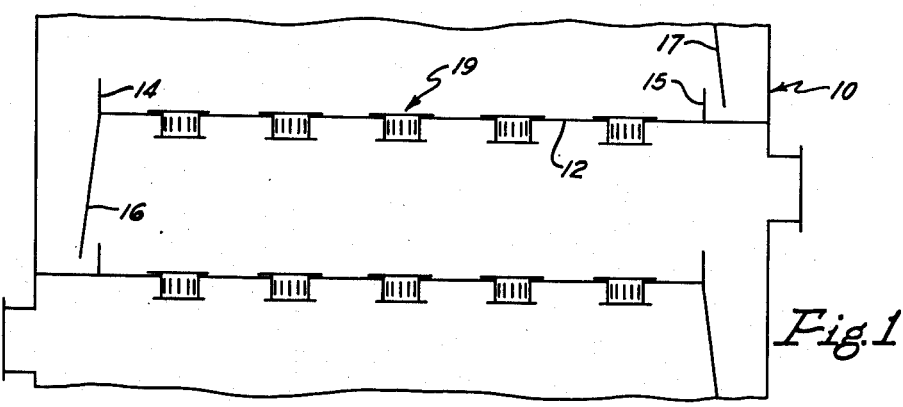
FIGURE 1 is a schematic sectional view of a portion of a fractionating column providing with trays of our invention.

In FIGURE 1 a portion of the interior of the fractionating tower 10 is shown diagrammatically. The vertical tower is provided with a series of horizontal trays, such as tray 12, which are usually spaced apart uniformly throughout the tower. Tray 12 has an outlet weir 14 extending across one side of the tray and an inlet weir 15 extending across the other side, although an inlet weir is not always essential for maintaining a liquid level on the tray. On the outlet side a downflow apron 16 extends below the tray and the outlet weir 14. The apron 16 and the wall of column 10 form a passage for the flow of liquid to the tray below. Likewise, liquid flows from the tray above tray 12 through the passage formed by apron 17 and the wall of the fractionating column. This liquid flows over weir 15 across tray 12 and over weir 14. In this manner a level of flowing liquid is maintained across tray 12 above the bubble caps.

Figure 2:
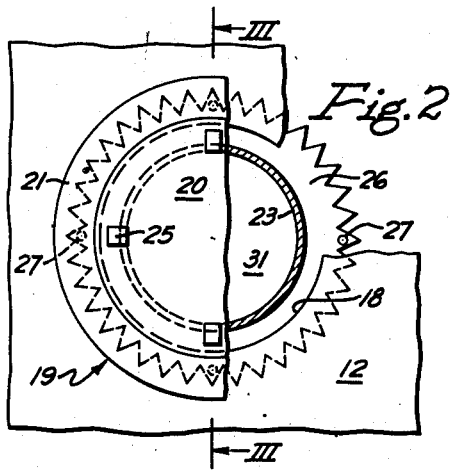
FIGURE 2 is a plan view, partly broken away, of one modification of a bubble cap assembly such as shown on the trays of FIGURE 1.
Figure 3:
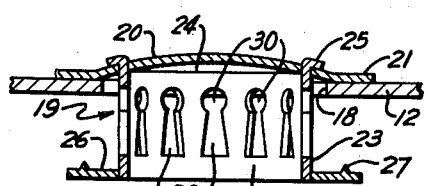
FIGURE 3 is a sectional view in elevation of the bubble cap assembly along line III—III of FIGURE 2, the assembly being in its lowermost position.

Tray 12 has openings or vapor passages 18 arranged in rows and each vapor passage is provided with a bubble cap assembly 19. The structure of these bubble cap assemblies is shown in detail in FIGURES 2–5. Referring to FIGURES 2 and 3, the assembly 19 comprises a disc-like, generally horizontal cap 20 which surmounts each opening 18 in the tray. Cap 20 can be a flat disc but, preferably, as shown in FIGURE 3, the underside of the cap 20 is concave. The rim 21 of the cap rests on the surface of tray 12 when vapor is not passing upwardly through openings 18 and entirely surrounds the opening covered by the cap. The rim of the cap thus forms a seal against the flow of liquid into openings 18.

The bubble cap assembly 19 further comprises a depending hollow cylindrical member 23. The upper rim 24 of the cylindrical member 23 is attached in any suitable manner to the underside of cap 20 such as by the use of lugs 25 which pass through slots in the cap 20 and are peened over so that the longitudinal axis of the cylindrical member passes substantially through the center of the generally circular cap 20.

Along its lower rim the cylindrical member is provided with a flange or lateral member 26. The flange member 26 extends radially from the cylindrical member 23 in a plane generally parallel to that of the cap 20. Usually, the flange member will extend about the same distance from the cylindrical member 23 as the periphery of cap 20, although it can extend somewhat more or less than cap 20. The essential feature of flange 26 is that its dimensions are such that the flange will limit the upward movement of cap 20 by abutting against the underside of tray 12 when the cap is raised to its uppermost position, as in FIGURE 4. The bubble cap assembly 19 is free to move vertically a distance equal to the distance between the bottom of the tray floor 12 and the upper surface of the flange member 26. Its lateral movement is limited by the sides of the cylindrical member 23.

To reduce the possibility of the flange member 26 sticking to the underside of tray 12 when the bubble cap assembly is raised, the upper surface of the flange member or the under surface of the tray in the area of contact can be provided with raised portions of small surface area to prevent flat surface contact of the tray and flange member. Thus, as shown in FIGURE 3, small raised points 27 can be cast or stamped in the upper surface of the flange member 26.

The cylindrical member 23 is provided with a plurality of vertical slots 28. These slots are usually uniformly spaced about the circumference of the cylindrical member 23 and extend from about the lower rim to the upper rim of member 23. Preferably, the slots are trapezoidal as shown in FIGURE 3 and have an enlarged opening 30 at the upper ends thereof but can be of any shape that will form small streams of vapor, e.g., triangular, rectangular, oval, etc.

We will describe the functioning of our bubble cap trays in fractional distillation of fluid mixtures by reference to one particular tray and bubble cap assembly as shown in the drawings. As we have indicated, liquid flows downwardly to tray 12 and over the inlet weir 15. A liquid level is formed between the weirs 14 and 15. The liquid moves horizontally across tray 12, flowing over weir 14 and then down to the next lower tray. Vapor formed on the next lower tray rises upwardly through the open end 31 of each bubble cap assembly and in small part through the annular space between the outer circumference of cylindrical member 23 and the tray opening 18. If the vapor velocity is sufficiently high, the bubble cap assembly is lifted from its position of rest on tray 12 as shown in FIGURE 3. The vapor passes through the open end 31 of the assembly, passes through the slots 28 and bubbles upwardly through the liquid which flows across tray 12. Since the cylindrical member 23 is provided with a plurality of slots 28, the vapor is divided into small portions flowing through the different openings. As a result, the vapor passes under the rim of cap 20 in small bubbles in reasonably uniform distribution around the rim.

If the vapor velocity is not sufficient to force vapor upwardly through the openings in the tray, the bubble cap assembly 19 remains seated on the floor of the tray as shown in FIGURE 3. The rim 21 resting on the tray floor forms a liquid seal and prevents liquid from flowing under the cap and into the openings 18. Consequently, liquid dumping does not occur.

Figure 4:
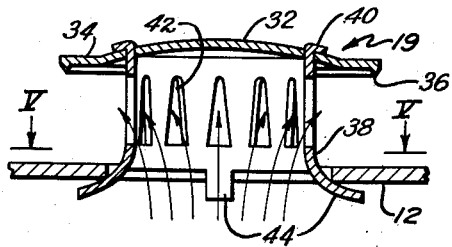
FIGURE 4 is a sectional view in elevation of another modification of the bubble cap assembly, the assembly being raised to its uppermost position.

If the vapor velocity is high, the bubble cap assembly will be raised to its highest position, as shown in FIGURE 4. It can also function in positions between those of FIGURES 3 and 4. A plurality of vapor passages is provided by the slots in the cylindrical member 23 and by the generally annular space between the bubble cap assembly and the circumference of tray opening 18. The vapor rising through opening 18 is thus divided into small portions. The formation of small bubbles of vapor is promoted and intimate vapor-liquid contact is made possible. This is further favored by the fact that cap 20 tends to remain horizontal when it rises. The hanging cylindrical member and its attached flange member serve as a means to stabilize the cap against tilting. This hanging weight gives the cap a low center of gravity and the cap cannot be easily tilted to release large bubbles of vapor or to permit the leakage of liquid under the tilted rim of the cap.

The division of the vapor stream into a plurality of small streams can be further promoted when the valve is in a partially open position by providing the flange member 26 with a notched or serrated rim as shown in FIGURE 2. The notches can be short notches as shown in FIGURE 2 or they can be deep notches extending all the way from the rim of the flange member to the cylindrical member 23. Deep notches will provide vapor passages through the generally annular space between the circumference of the opening 18 and the outer surface of the cylindrical member 23 even when the bubble cap assembly is in the fully raised position. Being uniformly spaced about the assembly, these notches will further aid in providing uniform distribution of small streams of vapor for contact with the liquid.

Within the scope of the invention modifications can be made in the structure shown in the drawing. We have already indicated that the cap 20 can be a flat disc or a concavo-convex disc as shown in FIGURE 3. The concavo-convex disc is preferred, because it aids in providing stability for the cap when lifted by upflowing vapor. A generally circular shape for the cap is preferred but other shapes are suitable. If desired, the cap can have a notched or serrated rim to improve vapor distribution but the notches must not be so deep as to interfere with the liquid sealing action of the cap when it rests on the tray floor as shown in FIGURE 3.

Although a concavo-convex structure of the cap is advantageous, a generally flattened cap as shown in the drawings is preferred because such caps provide the least resistance to liquid flow across the tray and also facilitate cleaning. As we have indicated, one great advantage of our novel apparatus is that the tray surface is substantially unobstructed. It is possible for a workman to enter a tower provided with our trays and to move about freely on the trays while cleaning the trays or making any necessary repairs.

Figure 5:
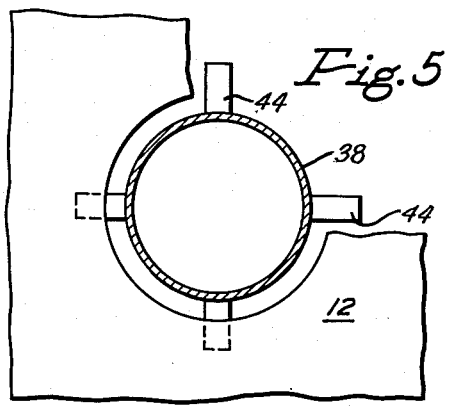
FIGURE 5 is a sectional plan view of the bubble cap assembly of FIGURE 4 taken along line V—V of FIGURE 4.

Another modification of our valve assembly is shown in FIGURES 4 and 5. The bubble cap assembly 19 comprises a cap 32 having a concavo-convex central portion and a flat rim 34. The rim 21 of cap 20 can rest flat on the tray floor 12 as shown in FIGURES 2 and 3. However, if large areas of the cap rim and tray floor are in flat contact, the cap may stick to the tray and require a very high vapor velocity to lift the cap from the tray initially. Therefore, in the preferred form of our bubble cap assembly the lower surface of the cap rim or the upper surface of the tray beneath the cap is provided with a raised area of small surface area that contacts the opposite surface of the tray or cap. For instance, as shown in FIGURE 4, the underside of cap rim 34 of cap 32 can be provided with a thin annular ridge 36. The cap rim 34 will then contact the tray floor 12 only along this thin ridge 36 and the chances of the cap 32 adhering unduly to the tray floor 12 will be reduced. A continuous annular ridge 36 on the rim 34 or tray 12 (not shown) will provide about the same sealing action as flat surfaces of rim and tray. However, with little or no loss in sealing effect, the underside of the cap rim 34 or the upper surface of the tray 12 can have, instead of a continuous ridge, a plurality of small raised points which will prevent flat surface contact of the rim 34 and tray floor 12.

Numeral 38 of FIGURES 4 and 5 refers to a cylindrical member which depends from cap 32 and is attached in any suitable manner to the underside of cap 32, such as by lugs 40, in a manner similar to that described for the attachment of cylindrical member 23 to cap 20 in FIGURES 2 and 3 above. The cylindrical member 38 is provided with a plurality of vertical slots 42 which are generally uniformly spaced about the circumference of the cylindrical member 38.

In FIGURE 2, the flange member 26 was illustrated as a serrated or notched continuous flange. Other structures performing its function can also be employed. The essential feature is that the flange or lateral member extends from the cylindrical member sufficiently to abut against the underside of tray 12 when the cap assembly is in the raised position of FIGURE 4 and thus limits the upward movement of the assembly. However, the lateral member need not be a continuous flange as shown but can comprise two or more, or preferably three or more, lateral extensions which will abut against the underside of the tray when the cap assembly is raised. FIGURES 4 and 5 illustrate a modification of the apparatus in which the flange or lateral member is not continuous. As shown in FIGURES 4 and 5, four lateral extensions 44, extend from the lower rim of cylindrical member 38. These extensions 44, can be simply outturned lugs or ears integral with or attached to the lower rim of the cylindrical member. Three or more of such extensions will usually perform satisfactorily the function of the flange member of limiting the upward movement of the bubble cap assembly.

FIGURE 4 illustrates another modified feature of the lateral extensions 44. As shown in FIGURE 4, the lateral extensions 44 are curved outwardly from the cylindrical member 38 instead of having the perpendicular relationship of the flange member 26 and cylindrical member 23 as shown in FIGURE 3. The curved structure of FIGURE 4 has the advantage that the upper surface of the flange member 44 and the undersurface of the tray floor do not come into flat contact. This reduces the possibility of the two surfaces sticking together and causing the cap to remain in a raised position when the vapor velocity drops.

The elements of the bubble cap assembly can be integral or can be fastened permanently or removably together. Thus, referring to FIGURES 2 and 3, the cap 20 can be formed integrally with the cylindrical member 23 or can be attached thereto permanently, as by welding, or removably, as by means of screw threads, slotted keys, peened lugs, etc. The use of peened lugs is a cheap and effective method of attaching these elements. FIGURE 3, as noted above, illustrates this type of attachment in which the lugs 25 pass through slots in the cap 20 and are peened over to attach the cap to the cylindrical member 23. The flange member 26 or 44 can also be integral with the cylindrical member 23 or 38, respectively, or can be attached thereto permanently, as by welding, or removably, as by screw threads, peened lugs, etc. Removable attachment of the cap and/or flange member to the cylindrical member facilitates removal of the bubble cap assembly from the tray if this is necessary for cleaning or repairing.

The shape of the apertures in the cylindrical member can be varied considerably. Vertical slots, such as slots 28 or 42 shown in FIGURES 3 and 4 respectively are preferred. These slots can be trapezoidal, rectangular, triangular, oval, etc. and can have an enlarged opening at the upper end thereof, such as large openings 30 of slots 28 in FIGURE 3. The provision of enlarged opening 30 at the top of each slot makes it possible for vapor to escape readily from the slots at low vapor velocity when the cap is lifted only slightly above the tray. The slots preferably should extend to or very close to the upper rim of the cylindrical member so that vapor will have a direct passage for escape when the cap is lifted slightly. In addition to vertical slots other forms of apertures can be used, for example, the cylindrical member can be provided with rows of perforations spaced uniformly about its circumference.

Because of the uncluttered tray surface provided by our apparatus the resistance to liquid flow across the tray is low. Therefore, the gradient in liquid head across the tray is small. However, there will be at least a small difference in liquid level across the tray and an advantage of our apparatus is that the weights of the bubble cap assemblies can be adjusted to compensate for the gradient of liquid head. The bubble cap assemblies on the liquid inlet side of the tray where the liquid level is high can be fabricated so as to be of lighter weight than those on the outlet side where the liquid level is low. By adjusting the weights of the bubble cap assemblies according to their positions on the tray the resistance to lifting of each bubble cap assembly resulting from the weight of the assembly and the liquid head above it can be made reasonably uniform so that all of the caps will open at about the same vapor velocity.

Figure 6:
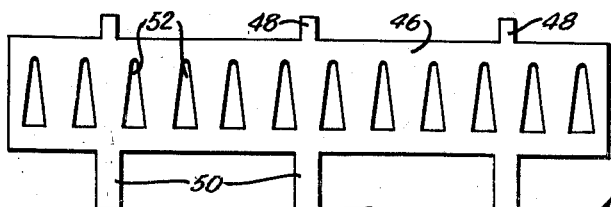
FIGURE 6 is a view of a stamped-out piece of sheet metal which can be used to form the cylindrical member of the bubble cap assembly.

Still another advantage of our novel apparatus is its simplicity and ease of fabrication. FIGURE 6 shows a suitable pattern for stamping the cylindrical member from sheet metal. The two smaller sides of the flat member with cutout portions as shown in FIGURE 6 can be brought together to form a cylindrical member 46 for our bubble cap assembly. The lugs 48 are inserted into slots in a cap and are peened over to attach the cap to the cylindrical member. The extensions 50 are bent approximately perpendicular to the vertical sides of the cylinder 46 to form the lateral or flange members of the bubble cap assembly. If desired, the cylindrical member 46 can be formed by stamping suitable slots and openings 52 in tubular stock. Thus, because of the simplicity of the bubble cap assemblies of our invention, they can be made by inexpensive fabrication methods.

Obviously many modifications and variations of the invention as hereinbefore set forth may be made without departing from the spirit and scope thereof and therefore only such limitations should be imposed as are indicated in the appended claims.

We claim:

1. Vapor-liquid contacting apparatus comprising a tray having a plurality of generally circular vapor passages, each provided with a vertically displaceable bubble cap assembly, said assembly comprising a generally circular disc-like cap surmounting the vapor passage with which said assembly is associated, said disc-like cap having a concavo-convex central portion and a flat rim, the outside diameter of said rim being substantially larger than the inside diameter of the vapor passage and forming a seal against the flow of liquid into said passage when the cap rests on the tray floor, the undersurface of said rim of said cap being provided with annular ridge means to prevent flat surface contact with said tray and thereby forming said seal, a depending cylindrical member attached to the underside of said cap and hanging through the vapor passage, said cylindrical member being hollow and open at its lower end and being provided with uniformly spaced vertical slots, said cylindrical member being provided at its lower rim with a sufficient number of extensions curved outwardly to limit the upward movement of the bubble cap assembly, said extensions being spaced apart vertically from the undersurface of said tray when the rim of said cap rests on the tray.

2. Vapor-liquid contacting apparatus comprising a tray having a plurality of generally circular vapor passages, each provided with a vertically displaceable bubble cap assembly, said assembly comprising a generally circular disc-like cap surmounting the vapor passage with which said assembly is associated, said disc-like cap having a concavo-convex central portion and a flat rim, the outside diameter of said rim being substantially larger than the inside diameter of the vapor passage and forming a seal against the flow of liquid into said passage when the cap rests on the tray floor, a depending cylindrical member attached to the underside of said cap and hanging through the vapor passage, said cylindrical member being hollow and open at its lower end and being provided with uniformly spaced vertical slots, said cylindrical member being provided at its lower rim with a flange member extending outwardly and generally circular to said cap, said flange member being spaced apart vertically from the undersurface of said tray when the rim of said cap rests on the tray, and said flange member being notched and provided with means to prevent flat surface contact with the undersurface of the tray.

References Cited in the file of this patent

UNITED STATES PATENTS

| | | |
|---|---|---|
| 1,057,576 | Mussell | Apr. 1, 1913 |
| 1,453,735 | Twining | May 1, 1923 |
| 2,061,830 | Campbell | Nov. 24, 1936 |
| 2,206,356 | Hutchings | July 2, 1940 |
| 2,428,889 | Nutter | Oct. 14, 1947 |
| 2,627,397 | Hendrix | Feb. 3, 1953 |
| 2,650,793 | Clark et al. | Sept. 1, 1953 |
| 2,658,737 | Nutter | Nov. 10, 1953 |
| 2,772,080 | Huggins et al. | Nov. 27, 1956 |
| 2,951,691 | Nutter | Sept. 6, 1960 |